UNITED STATES PATENT OFFICE.

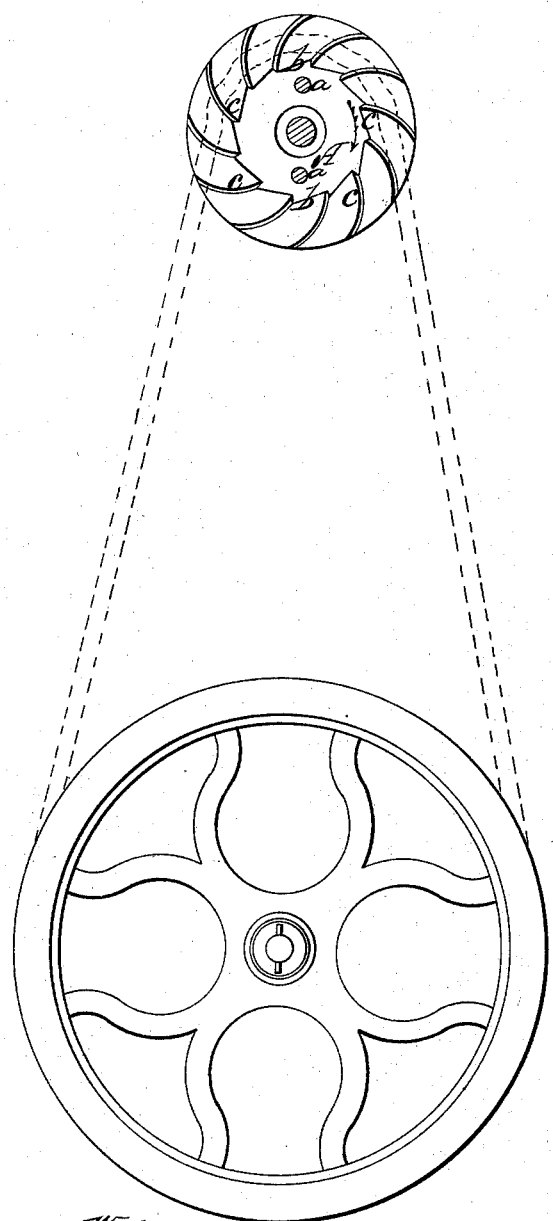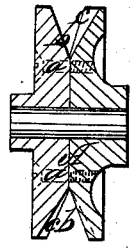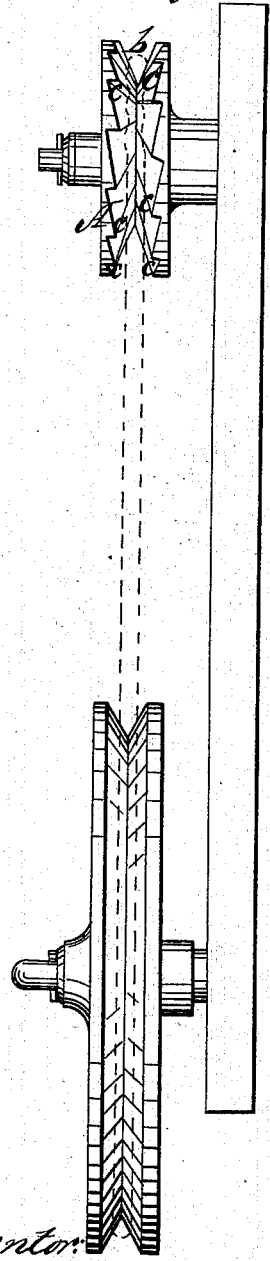

LOUIS PLANER, OF NEW YORK, N. Y.

GROOVED PULLEY.

Specification of Letters Patent No. 26,707, dated January 3, 1860.

*To all whom it may concern:*

Be it known that I, LOUIS PLANER, of the city, county, and State of New York, have invented a new and useful Improvement in Grooved Pulleys; and I do hereby declare that the following is a full, clear, and exact description of the same, referenece being had to the accompanying drawing, forming a part of this specification, in which—

Figure 1 represents a vertical section of my pulley taken transversely through the axle; Fig. 2 is a side elevation of the same, and Fig. 3 is a transverse vertical section of the same.

Similar letters of reference in the three views indicate corresponding parts.

The object of this invention is to arrange a grooved pulley in such a manner that it retains the belt perfectly tight when working in one direction, whereas when turned in the other direction it allows the belt to slip. With this object in view I have constructed my pulley with tangential ridges which extend from top to bottom on both sides of the groove and which are so arranged, that the ridges on one side of the groove stand exactly opposite to the spaces between the ridges on the other side. By this arrangement my pulley retains the belt exactly in the same manner, as pulleys with radial ridges in their grooves, when working in one direction, but, when working in the other direction, the belt is allowed to slip, and the turning of the pulley in the wrong direction has no injurious influence on the machine, which it is intended to drive.

To enable those skilled in the art to make and use my invention, I will proceed to describe it.

The pulley A is constructed of two parts which are fastened together by means of screws $a$, but it may also be made of one piece if it is desired. Each side of the groove $b$ is furnished with sharp pointed ridges $c$ running tangentially from the outer circumference of the pulley to the circle forming the bottom of the groove and in a direction opposite to the direction in which the pulley has to operate, and they are so arranged, that those on one side of the groove stand exactly opposite to the spaces between those on the other side, and they may be slightly curved as clearly shown in Fig. 1. If the belt is now placed into the groove quite loosely, the ridges on one side of the pulley force the same into the spaces between the ridges on the other side, and if a strain is exerted on the belt in the direction of the arrow, marked on the pulley in Fig. 1, the sharp edges of the ridges bite into the belt and retain it the more tenaciously, the stronger the strain on the belt. On the other hand, if the strain on the belt is in the direction opposite to the arrow, marked on the pulley in Fig. 1, the sharp edges of the ridges have no effect on the same and it is allowed to slip. This pulley is of particular advantage for sewing machines and for all such devices, where a turning in the wrong direction has an injurious or disturbing influence on the operation of the machine, and it must be remarked that grooved pulleys with radial ridges cannot be used in the same capacity as they retain the belt with equal tenacity in both directions.

I am aware that grooved pulleys with radial ridges have been heretofore constructed; such I do not claim, but

Having thus fully described my invention what I claim as new and desire to secure by Letters Patent as a new article of manufacture is:

A grooved pulley A arranged with tangential ridges $c$ on the sides of the groove $b$ as and for the purpose specified.

LOUIS PLANER.

Witnesses:
J. AUGUST HASSLEN,
TH. BELL.